US012786862B2

(12) United States Patent
Liu

(10) Patent No.: US 12,786,862 B2
(45) Date of Patent: Nov. 3, 2026

(54) TRANSMISSION CONFIGURATION METHOD AND DEVICE

(71) Applicant: VIVO MOBILE COMMUNICATION CO., LTD., Dongguan (CN)

(72) Inventor: Jiamin Liu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 758 days.

(21) Appl. No.: 18/100,118

(22) Filed: Jan. 23, 2023

(65) Prior Publication Data

US 2023/0156587 A1 May 18, 2023

Related U.S. Application Data

(63) Continuation of application No. PCT/CN2021/120613, filed on Sep. 26, 2021.

(30) Foreign Application Priority Data

Sep. 29, 2020 (CN) ......................... 202011053539.5

(51) Int. Cl.

*H04W 48/18* (2009.01)
*H04W 76/14* (2018.01)
*H04W 76/15* (2018.01)
*H04W 80/02* (2009.01)
*H04W 92/18* (2009.01)

(52) U.S. Cl.

CPC ........... *H04W 48/18* (2013.01); *H04W 76/14* (2018.02); *H04W 76/15* (2018.02); *H04W 80/02* (2013.01); *H04W 92/18* (2013.01)

(58) Field of Classification Search

CPC ... H04W 8/22; H04W 48/18; H04W 36/0009; H04W 72/23-232; H04W 76/14; H04W 76/15; H04W 76/27; H04W 80/02; H04W 88/04; H04W 92/18; H04W 80/04-12; H04L 12/5691; H04L 69/14

See application file for complete search history.

(56) References Cited

U.S. PATENT DOCUMENTS

2019/0281644 A1 9/2019 Hu et al.
2020/0029384 A1* 1/2020 Hong .................. H04W 36/305
2020/0162894 A1 5/2020 Yang (Continued)

FOREIGN PATENT DOCUMENTS

CN 110536262 A 12/2019
CN 110958090 A 4/2020

(Continued)

OTHER PUBLICATIONS

3GPP, 3rd Generation Partnership Project; Technical Specification Group Radio Access Network; NR; Study on NR Vehicle-to-Everything (V2X) (Release 16), 3GPP TR 38.885 v. 16.0.0, Mar. 2019.

(Continued)

*Primary Examiner* — Thomas R Cairns
(74) *Attorney, Agent, or Firm* — The Webb Law Firm

(57) ABSTRACT

A transmission configuration method includes: sending, by a first access network device, bearer-related information to a first terminal device. The bearer-related information is used to instruct the first terminal device to perform cooperative transmission with a second terminal device.

20 Claims, 5 Drawing Sheets

(56) References Cited

U.S. PATENT DOCUMENTS

| | | | | |
|---|---|---|---|---|
| 2020/0205209 | A1 | 6/2020 | Pan et al. | |
| 2020/0351669 | A1* | 11/2020 | Xu | H04W 76/14 |
| 2020/0359428 | A1* | 11/2020 | Pan | H04W 76/10 |
| 2021/0258987 | A1 | 8/2021 | Yang | |
| 2022/0014960 | A1* | 1/2022 | Lee | H04L 5/001 |
| 2022/0217575 | A1 | 7/2022 | Wang et al. | |
| 2023/0269799 | A1* | 8/2023 | Cai | H04W 72/40<br>370/329 |

FOREIGN PATENT DOCUMENTS

| | | | |
|---|---|---|---|
| CN | 111565416 | A | 8/2020 |
| EP | 3579642 | A1 | 12/2019 |
| WO | 2018177672 | A1 | 10/2018 |
| WO | 2020085831 | A | 4/2020 |
| WO | 2021098804 | A1 | 5/2021 |

OTHER PUBLICATIONS

Huawei et al., "Support for UE Cooperation in NR", 3GPP TSG RAN WG1 Meeting #85, Nanjing, China, May 23-27, 2016, R1-164379.

Huawei et al., "Further views on Rel-17 work area on NR sidelink enhancements for V2X and other use cases", 3GPP TSG RAN WG1 Meeting #85, Newport Beach, USA, Sep. 16-20, 2019, RP-191831.

* cited by examiner

TRANSMISSION CONFIGURATION METHOD AND DEVICE

CROSS-REFERENCE TO RELATED APPLICATIONS

This application is a Bypass Continuation Application of PCT/CN2021/120613 filed Sep. 26, 2021, and claims priority to Chinese Patent Application No. 202011053539.5 filed Sep. 29, 2020, the disclosures of which are hereby incorporated by reference in their entireties.

BACKGROUND OF THE INVENTION

Field of the Invention

This application relates to the communications field, and in particular, to a transmission configuration method and apparatus, and a device.

Description of Related Art

Currently, a long term evolution (LTE) system supports sidelink (SL, which may also be referred to as sidelink, side link, SL, or the like) transmission. The SL is used for direct data transmission between user equipments (UE, which may also be referred to as a terminal device, a user terminal, a mobile terminal, or the like) without using a network device, as shown in FIG. 1.

SUMMARY OF THE INVENTION

According to a first aspect, a transmission configuration method is provided, where the method includes: sending, by a first access network device, bearer-related information to a first terminal device, where the bearer-related information is used to instruct the first terminal device to perform cooperative transmission with a second terminal device.

According to a second aspect, a transmission configuration apparatus is provided and applied to a first access network device, where the apparatus includes: a sending module, configured to send bearer-related information to a first terminal device, where the bearer-related information is used to instruct the first terminal device to perform cooperative transmission with a second terminal device.

According to a third aspect, a network-side device is provided and includes a memory, a processor, and a program or instructions stored in the memory and executable on the processor, where when the program or instructions are executed by the processor, the step of the transmission configuration method according to the first aspect is implemented.

According to a fourth aspect, a transmission configuration method is provided, where the method includes: receiving, by a first terminal device, bearer-related information configured by a first access network device; and performing, by the first terminal device, cooperative transmission with a second terminal device according to the bearer-related information.

According to a fifth aspect, a transmission configuration apparatus is provided and applied to a first terminal device, where the apparatus includes: a receiving module, configured to receive bearer-related information configured by a first access network device; and a processing module, configured to perform cooperative transmission with a second terminal device according to the bearer-related information.

According to a sixth aspect, a terminal device is provided and includes a memory, a processor, and a program or instructions stored in the memory and executable on the processor, where when the program or instructions are executed by the processor, the steps of the transmission configuration method according to the fourth aspect are implemented.

According to a seventh aspect, a non-transitory computer-readable storage medium is provided, where the non-transitory computer-readable storage medium stores a program or instructions, and when the program or instructions are executed by a processor, the step of the transmission configuration method according to the first aspect is implemented; or when the program or instructions are executed by a processor, the steps of the transmission configuration method according to the fourth aspect are implemented.

According to an eighth aspect, a computer program product is provided, where the computer program product is stored in a non-volatile readable storage medium, and when the computer program product is executed by a processor, the step of the transmission configuration method according to the first aspect is implemented; or when the computer program product is executed by a processor, the steps of the transmission configuration method according to the fourth aspect are implemented.

According to a ninth aspect, a chip is provided, where the chip includes a processor and a communications interface, the communications interface is coupled to the processor, and the processor is configured to execute a program or instructions on a network-side device or a terminal device to implement the step of the transmission configuration method according to the first aspect or implement the steps of the transmission configuration method according to the fourth aspect.

BRIEF DESCRIPTION OF THE DRAWINGS

The accompanying drawings described herein are intended for understanding of this application, and constitute a part of this application. Exemplary embodiments and descriptions thereof in this application are intended to interpret this application and do not constitute any improper limitation on this application.

DESCRIPTION OF THE INVENTION

The following clearly describes the technical solutions in the embodiments of this application with reference to the accompanying drawings in the embodiments of this application. Apparently, the described embodiments are only some rather than all of the embodiments of this application. All other embodiments obtained by a person of ordinary skill in the art based on the embodiments of this application shall fall within the protection scope of this application.

The terms "first", "second", and the like in this specification and claims of this application are used to distinguish between similar objects instead of describing a specific order or sequence. It should be understood that the terms used in this way are interchangeable in appropriate circumstances, so that the embodiments of this application can be implemented in other orders than the order illustrated or described herein. In addition, objects distinguished by "first" and "second" usually fall within one class, and a quantity of objects is not limited. For example, there may be one or more first objects. In addition, the term "and/or" in the specification and claims indicates at least one of connected objects, and the character "/" generally represents an "or" relationship between associated objects.

It should be noted that technologies described in the embodiments of this application are not limited to a long time evolution (LTE)/LTE-Advanced (LTE-A) system, and can also be used in other wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are usually used interchangeably. The described technologies may be used for the foregoing systems and radio technologies, and may also be used for other systems and radio technologies. However, in the following descriptions, a new radio (NR) system is described for an illustrative purpose, and NR terms are used in most of the following descriptions. These technologies may also be applied to other systems than an NR system, for example, a 6-th Generation (6G) communications system.

Figure 1:
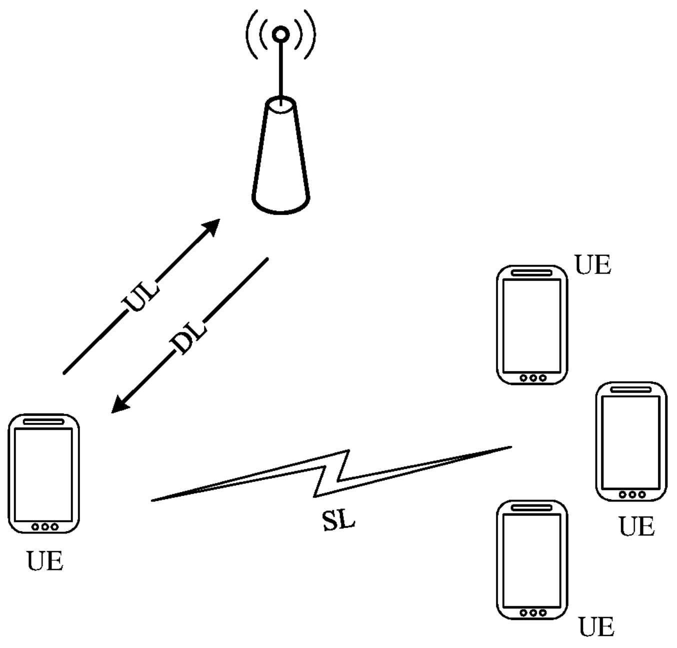
FIG. 1 is a schematic diagram of a communication scenario including a sidelink according to an embodiment of this application.
Figure 2:
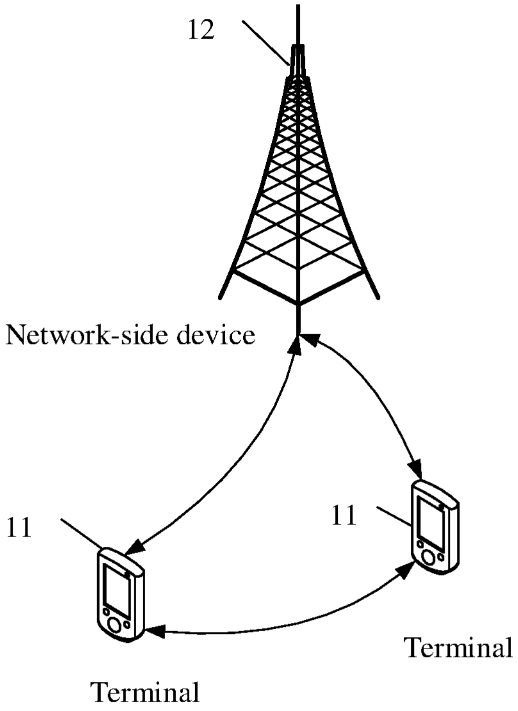
FIG. 2 is a block diagram of a wireless communications system to which an embodiment of this application may be applied.

FIG. 2 is a block diagram of a wireless communications system to which an embodiment of this application may be applied. The wireless communications system includes a terminal 11 and a network-side device 12. The terminal 11 may also be referred to as a terminal device or a user terminal. The terminal 11 may be a terminal-side device such as a mobile phone, a tablet computer, a laptop computer or a notebook computer, a personal digital assistant (PDA), a palmtop computer, a netbook, an ultra-mobile personal computer (UMPC), a mobile Internet device (MID), a wearable device, a vehicular device, or a pedestrian terminal. The wearable device includes a smart band, an earphone, glasses, or the like. It should be noted that a type of the terminal 11 is not limited in the embodiments of this application. The network-side device 12 may be a base station or a core network. The base station may be referred to as an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmission and reception point (TRP), or another appropriate term in the art, as long as the same technical effect is achieved. The base station is not limited to specific technical terms. It should be noted that in the embodiments of this application, only a base station in an NR system is used as an example, but a type of the base station is not limited.

The following describes in detail transmission configuration methods provided in the embodiments of this application by using some embodiments and application scenarios thereof with reference to the accompanying drawings.

When data transmission is performed between two or more UEs, how to implement continuous transmission of common service data between the plurality of UEs becomes an urgent technical problem to be resolved.

Figure 3:
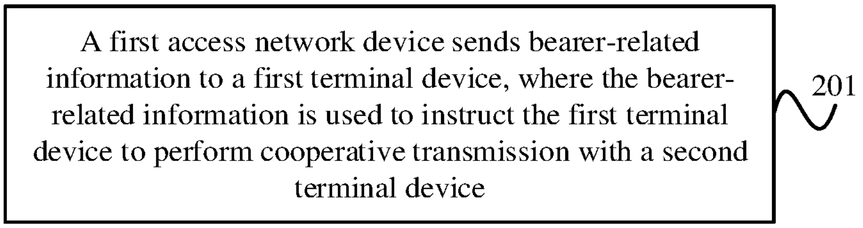
FIG. 3 is a schematic flowchart of a transmission configuration method according to an embodiment of this application.

Referring to FIG. 3, an embodiment of this application provides a transmission configuration method. The method includes the following step.

Step 201: A first access network device sends bearer-related information to a first terminal device, where the bearer-related information is used to instruct the first terminal device to perform cooperative transmission with a second terminal device.

In this embodiment of this application, the first access network device configures corresponding bearer-related information for each of a plurality of terminal devices separately. In this case, corresponding bearer-related information can be configured for any one of the plurality of terminal devices, that is, the first terminal device, so that the first terminal device can perform cooperative transmission with the second terminal device according to the bearer-related information, where the second terminal device includes at least one terminal device other than the first terminal device. Therefore, configuring bearer-related information enables at least two terminal devices to perform cooperative transmission, so that continuous transmission is implemented between the at least two terminal devices, thereby ensuring service experience of the terminal devices and system efficiency.

Optionally, in the transmission configuration method in this embodiment of this application, the cooperative transmission between the at least two terminal devices may also be understood as aggregation transmission or dual connectivity (DC) transmission.

Optionally, in the transmission configuration method in this embodiment of this application, the first access network device may configure a bearer for the first terminal device by using the bearer-related information, so that the first terminal device and the second terminal device can perform bearer aggregation, thereby ensuring implementation of cooperative transmission. The bearer-related information includes one of the following:

(1) A packet data convergence protocol (PDCP) bearer. In this embodiment, the first access network device configures only a PDCP bearer for the first terminal device. In this case, the first access network device configures a radio link control (RLC) bearer for the second terminal device. In other words, the PDCP bearer and the RLC bearer are located in different terminal devices. In an example, this type of bearer may be denoted as a UE1-UE2 bearer, where UE1 represents that the PDCP bearer is in the UE1, for example, a PDCP bearer n1 in the UE1, and UE2 represents that the RLC bearer is in the UE2, for example, an RLC bearer m1 in the UE2.

(2) A radio link control (RLC) bearer. In this embodiment, the first access network device configures only an RLC bearer for the first terminal device. In this case, the first access network device may configure a PDCP bearer for the second terminal device. In other words, the PDCP bearer and the RLC bearer are located in different terminal devices. In an example, this type of bearer may be denoted as a UE2-UE1 bearer, where UE2 represents that the PDCP bearer is in the UE2, and UE1 represents that the RLC bearer is in the UE1. In another example, this type of bearer may alternatively be denoted as a split bearer, that is, a UE2 split bearer. The PDCP bearer is located in the UE2, and at least one RLC bearer is located in other terminal devices than the UE2. For example, one RLC bearer is located in the UE1. For another example, two RLC bearers are located in the UE1 and UE3.

(3) A PDCP bearer and an RLC bearer. In this embodiment, the first access network device configures a PDCP bearer and an RLC bearer for the first terminal device. In this case, the first access network device may configure an RLC bearer for the second terminal device. In other words, the PDCP bearer is located in one of a plurality of terminal devices, and the corresponding RLC bearers are located in at least two of the plurality of terminal devices. In an example, this type of bearer may be denoted as a split bearer, that is, the PDCP bearer is located in UE1, and the RLC bearers may be located in two or more terminal devices, such as the UE1 and UE2. In this case, a PDCP bearer n1 and an RLC bearer n2 are located in the UE1, and an RLC bearer m1 is located in the UE2.

The PDCP bearer mainly refers to a part formed by a PDCP entity and entities above the PDCP entity corresponding to a dedicated radio bearer and mainly includes a PDCP sublayer and an SDAP sublayer. Because a PDCP layer is an important protocol layer that provides functions such as reordering and security, ownership of the PDCP layer determines how security parameters are used and in which node a reordering function is located. The PDCP layer is a relatively important protocol layer that provides service continuity and security. An RLC layer and lower protocol layers mainly provide air interface transmission. Optionally, the PDCP bearer may be denoted as including two layers of protocol stacks: PDCP and service data adaptation protocol (SDAP). The RLC bearer includes three layers: RLC, medium access control (MAC), and physical layer (PHY).

Figure 4:
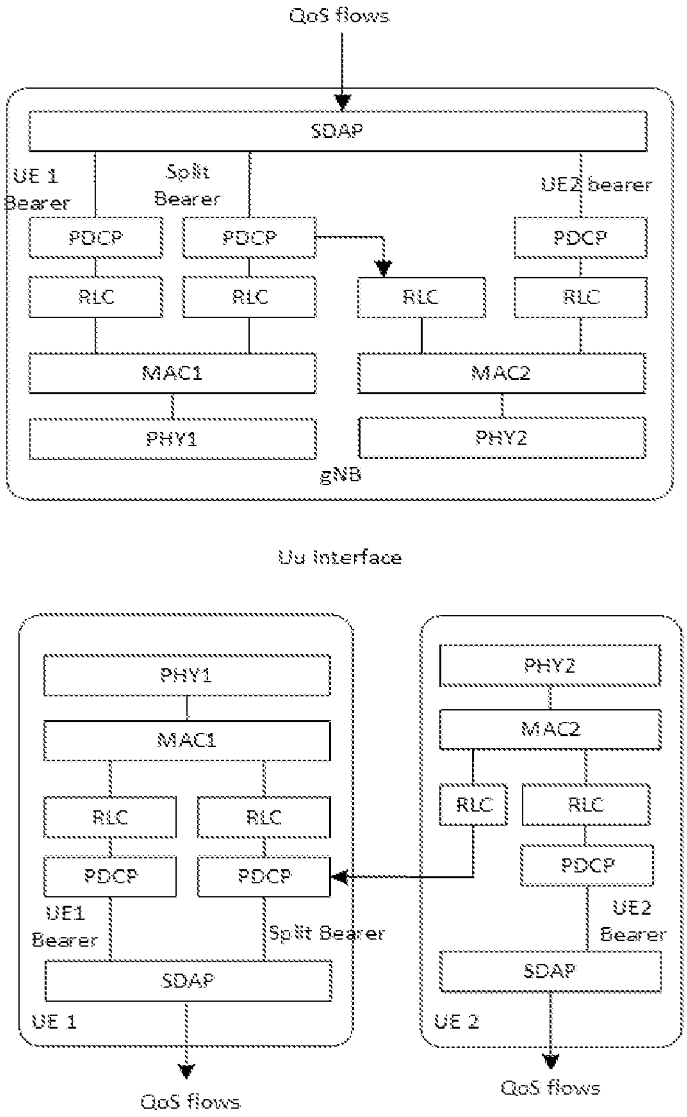
FIG. 4 is a schematic diagram of bearer aggregation between a plurality of terminal devices according to an embodiment of this application.

Optionally, as shown in FIG. 4, the split bearer is a typical UE1 split bearer in which the PDCP bearer is located in the UE1 and two RLC bearers are located in the UE1 and the UE2 respectively. Because the split bearer can use a plurality of legs (RLC bearer) for transmission, the split bearer may further include the following two transmission modes.

(1) Split transmission: it means that only one path can be selected for transmitting a data packet: either an RLC bearer 1 or an RLC bearer 2. A selection mechanism may be configured by a network-side device (such as a base station).

(2) Duplication transmission: it means that duplication transmission of a data packet is performed on two or more paths simultaneously, that is, duplication transmission is performed on an RLC bearer 1 and an RLC bearer 2 simultaneously. Duplication transmission may be configured by the network-side device (such as a base station).

In other words, either the split transmission mode or the duplication transmission mode may be used between the RLC bearers. In addition, it should be noted that, whichever of the foregoing transmission modes is used, data of an RLC service data unit (SDU) finally converges at a unified PDCP entity for reordering and duplication detection. Then duplicate data is deleted and data is reordered and then delivered to a higher layer.

Optionally, in the transmission configuration method in this embodiment of this application, based on the bearer-related information, the first access network device may configure simultaneous selective transmission of a service or a quality of service (QoS) flow or a data radio bearer (DRB) in the UE1 and the UE2, and configure the PDCP bearer in one of the UEs, such as the UE1 or the UE2; or configure simultaneous duplication transmission of a service or a QoS flow or a DRB in the UE1 and the UE2; or configure the PDCP bearer and the RLC bearer as located in the UE1 and the UE2 respectively.

Optionally, in the transmission configuration method in this embodiment of this application, the bearer-related information may include: RLC bearers corresponding to PC5 interfaces of the first terminal device and the second terminal device. In other words, during cooperative transmission between the plurality of terminal devices, the terminal devices can perform transmission through interfaces between the terminal devices. For example, a PC5 RLC bearer is configured on a direct connection interface PC5 interface or a sidelink interface.

Optionally, in the transmission configuration method in this embodiment of this application, the bearer-related information may further include at least one of: a correspondence between an RLC bearer corresponding to a PC5 interface of the first terminal device and an RLC bearer corresponding to a Uu interface (a cellular communications interface) of the first terminal device; or a correspondence between an RLC bearer corresponding to a PC5 interface of the first terminal device and a PDCP bearer corresponding to a Uu interface of the first terminal device.

Figure 5:
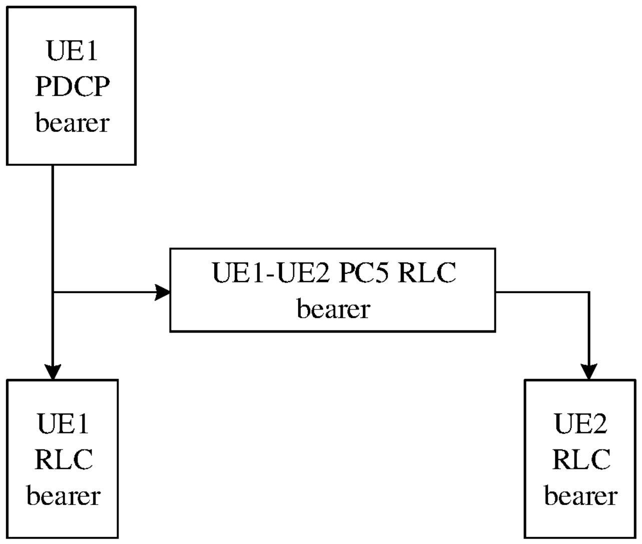
FIG. 5 is a schematic diagram of a mapping relationship between bearers according to an embodiment of this application.

In other words, an RLC bearer corresponding to a PC5 interface of each terminal device may be in a one-to-one correspondence with a corresponding Uu PDCP entity that requires forwarding between terminal devices. Optionally, the configuration may be performed by using PC5 RRC signaling. In an example, as shown in FIG. 5, a UE1 PDCP bearer is split to a UE1 RLC bearer and a UE1-UE2 PC5 RLC bearer (→UE2 RLC bearer), equivalent to two optional paths. From a perspective of the UE1, the UE1 needs to know a mapping relationship of PDCP bearer↔PC5 RLC bearer, to send and receive data. For the UE2, the UE2 needs to know a mapping relationship of PC5 RLC bearer↔UE2 RLC bearer, to send and receive data.

Optionally, in the transmission configuration method in this embodiment of this application, the first terminal device satisfies at least one of:

(1) a preset subscription condition, for example, a sharing package, common charging, or user binding;

(2) reporting a user's terminal service usage preference, where for example, the user wishes to ensure service continuity between personal devices for services such as listening to books or music;

(3) having a same setting or status requirement for a same terminal application as the second terminal device, where for example, a continuous reception requirement for a common service or application (APP is set in two devices of a user);

(4) synchronously receiving service data of a same terminal application with the second terminal device, where for example, a synchronous listening state for a common service or APP is set in two devices of a user; or (5) a preset condition for communication with the second terminal device. In other words, regardless of the UE1 split bearer or the UE1-UE2 bearer, considering that the two types of bearers are both characterized in that the PDCP bearer and the RLC bearer are located in different UEs but a UE-UE interface needs to be used for convergence of RLC SDUs at the PDCP entity, such special bearers are performed in a case that the two UEs are close to each other and satisfy a UE-UE communication condition.

Optionally, in the transmission configuration method in this embodiment of this application, before step 201, the method may further include the following content: that the first access network device receives a first request, where the first request carries at least one of:

(1) an identifier of the second terminal device, where for example, the UE1 carries an identifier of the UE2 in dedicated RRC signaling of the UE1, and this identifier may be a permanent identifier or a temporary identifier;

(2) a correspondence between service data and a bearer type, where for example, the UE1 requests to configure its own DRB 1/2/3 (or QoS flow 1/2/3, or another service) as a UE1 split bearer, or the UE1 requests to configure its own DRB 4/5 (or QoS flow 4/5, or another service) as a UE1-UE2 bearer, or the UE1 requests to configure its own DRB 6/7 (or QoS flow 6/7, or another service) as a UE2-UE1 bearer or a UE1-UE2 bearer; or (3) link quality between the first terminal device and the second terminal device, for example, PC5 reference signal received power (RSRP).

Optionally, the step in which the first access network device receives the first request may be performed in one of the following embodiments.

In an embodiment 1, the first access network device receives the first request sent by a core network device. In this embodiment, a request of the UE1 may first reach a core network through a non-access stratum (NAS) process, and the core network performs permission verification and then instructs the base station to perform the configuration after the verification succeeds.

In an example, the first terminal device UE1 initiates a service request for cooperative transmission, raises a requirement for multi-device aggregation service transmission in a service initiation process or an intermediate service continuity process, and reports the requirement to the network side. The core network verifies the requirement, for example, whether the function is allowed in subscription data. After the verification succeeds, the core network notifies the base station that the bearer aggregation configuration can be performed on the two terminal devices. In this case, the request of the UE1 can first reach the core network through the NAS process, and the core network performs permission verification and then instructs the base station to perform the configuration after the verification succeeds.

In an embodiment 2, the first access network device receives the first request sent by the first terminal device, where the first request is carried in dedicated radio resource control (RRC) signaling. In this embodiment, alternatively, the request of the UE1 may directly reach the access network device (such as the base station) through its own RRC process, the access network device requests verification from the core network, and after the verification succeeds, the access network device performs the configuration. Alternatively, bearer-related information such as UE binding or a permitted service type is stored in context information of the UE1, and the access network device performs the configuration after the verification.

Optionally, in the transmission configuration method in this embodiment of this application, the step in which the first access network device receives the first request sent by the first terminal device may include the following content:

receiving, by the first access network device, the first request sent by the first terminal device in a case that at least one of the following is satisfied: support of the first access network device for configuring the bearer-related information for the first terminal device; or a first condition configured by the first access network device, where the first condition includes at least one of: link quality between the first terminal device and the second terminal device being higher than a first quality threshold, or cooperative transmission of specific service data being performed between the first terminal device and the second terminal device. In other words, before the terminal device initiates a requirement for cooperative transmission, the terminal device needs to know whether its service network supports this function, and needs to satisfy a condition configured by the network. For example, link quality between the two terminal devices satisfies a threshold requirement. For example, PC5 RSRP is higher than a threshold 1, and/or multi-device aggregation transmission is allowed for only a specific service, such as a real-time multimedia service.

Optionally, after the access network device configures cooperative transmission between the plurality of terminal devices, two or more terminal devices perform transmission according to a configured bearer mode. It should be noted that if a bearer is configured as a split bearer, the network side further needs to additionally configure parameters related to data routing of the split bearer, for example, which RLC bearer is a primary leg, where data is transmitted on the primary leg by default, and in a case that what condition is satisfied, transmission can be performed on a secondary leg, for example, in a case that an amount of data in a buffer exceeds a threshold, the secondary leg, that is, an RLC bearer other than the primary leg, can be selected for transmission; or if a bearer is configured as a duplication bearer, the bearer first needs to be configured as a split bearer, that is, two or more RLC bearers are required in different UEs and correspond to a same PDCP bearer; and a duplication function may be configured for the split bearer, that is, duplication transmission may be performed on two or more RLC bearers. In addition, optionally, an initial status of duplication may be configured: activated after configuration (duplication transmission can be performed after the configuration is completed), or deactivated after configuration (additional activation signaling is required for performing duplication transmission after the configuration is completed), and whether dynamic activation/deactivation of duplication is supported. After the configuration is completed, the terminal devices can perform cooperative transmission according to the parameters configured by the network and related dynamic control.

Optionally, in the transmission configuration method in this embodiment of this application, the method may further include at least one of the following:

(1) The first access network device sends first configuration signaling to the first terminal device, where the first configuration signaling is used to instruct to configure or reconfigure a bearer of the first terminal device. In this embodiment, for the UE1 that initiates the request, because the UE1 is currently in an RRC_connected state, the network-side device (such as the base station) only needs to reconfigure the UE1, delete an original bearer, and reconfigure a required aggregate bearer. If a PDCP bearer of the bearer is located in the UE1, the network-side device (such as the base station) configures a PDCP configuration and an SDAP configuration for the UE1, and considers by default or specifies that the PDCP bearer uses a key and security parameters of the UE1. If an RLC bearer of the bearer is located in the UE1, the network-side device (such as the base station) configures an RLC configuration and corresponding MAC and PHY configurations for the UE1. Reconfiguration signaling provided for the UE1 may include configurations of a plurality of aggregate bearers.

(2) In a case that the second terminal device enters an RRC_connected state and is within coverage of a same access network device as the first terminal device, the first access network device sends second configuration signaling to the second terminal device, where the second configuration signaling is used to instruct to configure or reconfigure a bearer of the second terminal device. In this embodiment, for another UE2, if the UE2 is already in the RRC_connected state, and a serving network-side device (such as a base station) is the same as a serving network-side device (such as a base station) of the UE1, reconfiguration signaling is directly sent to the UE2 for configuring a required aggregate bearer. If a PDCP bearer of the bearer is located in the UE2, the network-side device (such as the base station) configures a PDCP configuration and an SDAP configuration for the UE2, and considers by default or specifies that the PDCP bearer uses a key and security parameters of the UE2. If an RLC bearer of the bearer is located in the UE2, the network-side device (such as the base station) configures an RLC configuration and corresponding MAC and PHY configurations for the UE2. The reconfiguration signaling provided for the UE2 may include configurations of a plurality of aggregate bearers.

(3) In a case that the second terminal device is not in an RRC_connected state, the first access network device pages the second terminal device, and after the second terminal device enters the RRC_connected state, the first access network device sends third configuration signaling to the second terminal device, where the third configuration signaling is used to instruct to configure or reconfigure a bearer of the second terminal device. In this embodiment, for another UE2, if the UE2 is not in the RRC_connected state, the network-side device (such as the base station) may initiate paging to the UE, and after the UE2 enters the RRC_connected state, the network-side device sends reconfiguration signaling to the UE2 to configure a required aggregate bearer. Configuration content is similar to content of a corresponding part in the foregoing (2).

(4) In a case that the first terminal device and the second terminal device are within coverage of different access network devices, after the second terminal device is handed over to coverage of the first access network device, the first access network device sends fourth configuration signaling to the second terminal device, where the fourth configuration signaling is used to instruct to configure or reconfigure a bearer of the second terminal device. In this embodiment, if another UE2 is not within coverage of a same network-side device (such as a base station), for example, if the UE2 establishes an RRC connection to another network-side device (such as a base station) after the UE2 has established an RRC connection to another network-side device (such as a base station) or has received paging message, a processing mode is as follows: in a case relating to different network-side devices (such as base stations), the UE is first handed over to a same network-side device (such as a base station), and then unified control is performed.

(5) In a case that the first terminal device and the second terminal device are within coverage of different access network devices, the first access network device sends fifth configuration signaling to a second access network device corresponding to the second terminal device, where the fifth configuration signaling is used to instruct the second access network device to configure or reconfigure a bearer of the second terminal device. In this embodiment, if another UE2 is not within coverage of a same network-side device (such as a base station), for example, if the UE2 establishes an RRC connection to another network-side device (such as a base station) after the UE2 has established an RRC connection to another network-side device (such as a base station) or has received paging, a processing mode is as follows: in cooperative control relating to different network-side devices (such as base stations), a serving network-side device (such as a base station) 1 of the UE1 sends a recommended configuration to a serving network-side device (such as a base station) 2 of the UE2. A network-side device (such as a base station) that determines configuration parameters is a network-side device (such as a base station) in which a PDCP bearer is located. RLC bearer configurations are also determined by network-side devices (such as base stations) to which the RLC bearers belong. For example, for an aggregate bearer, if its PDCP bearer is located in the UE1, the network-side device (such as the base station) 1 determines to send PDCP and SDAP configurations to the UE1. For a split bearer, configurations of various layers of an RLC bearer on the UE1 side are determined by the network-side device (such as the base station) 1, and configurations of various layers of an RLC bearer on the UE2 side are determined by the network-side device (such as the base station) 2 and sent to the UE2. The two network-side devices (such as base stations) also need to establish a forwarding path for a PDCP PDU for the split bearer, so that data on the RLC bearer can reach the PDCP bearer.

It should be noted that security parameters such as a key and algorithm selection are configured through interaction between the UE in which the PDCP layer is located and the network-side device (such as the base station) to which the UE belongs, and the network-side device (such as the base station) configures the security parameters for the UE.

Optionally, in the transmission configuration method in this embodiment of this application, the method may further include the following content: that the first access network device reconfigures the bearer-related information. In this embodiment, after multi-device cooperation or an aggregate bearer is configured, it may be necessary to reconfigure the bearer due to changes of requirements or situations.

Optionally, in the transmission configuration method in this embodiment of this application, the step in which the first access network device reconfigures the bearer-related information includes at least one of the following:

(1) In a case that an answer mode of a user corresponding to the first terminal device is changed, the first access network device reconfigures the bearer-related information. In this embodiment, the answer mode of the user is changed. For example, the user previously uses a mobile phone to answer a call and then uses a watch to answer the call, or vice versa.

(2) In a case that link quality between the first terminal device and the second terminal device is higher than a second quality threshold, the first access network device reconfigures the bearer-related information. In this embodiment, a link between two or more terminal devices is changed. For example, two terminal devices are previously close to each other, a link between the terminal devices satisfies a communication requirement, and transmission can be performed by using an aggregate bearer, but later, the two terminal devices are far away from each other and do not satisfy the communication requirement any longer, and transmission cannot be performed by using the aggregate bearer.

Optionally, in the transmission configuration method in this embodiment of this application, the reconfigured bearer-related information is used to indicate at least one of:

that in a case that a PDCP bearer is changed, the first terminal device is to perform a first operation on the PDCP bearer, where the first operation includes at least one of reestablishment or security update; that in a case that a PDCP bearer is not changed, the first terminal device is to perform PDCP data recovery; or that the first terminal device is to reset all state variables.

In this embodiment, there are at least the following two cases for a protocol data unit (PDU) session connection corresponding to the bearer reconfiguration.

In one case, a core network connection corresponding to the bearer is maintained. This case refers to a case that the core network connection remains unchanged before and after an aggregate bearer is configured, or after an aggregate bearer configuration and cancellation of the aggregate bearer configuration. For example, the UE1 initiates a service connection, uses its own PDU session, then reconfigures a multi-device aggregate bearer, and still maintains a PDU session of the UE1. Then because a condition of the aggregate bearer is not satisfied, only a UE1 bearer is configured again. In this case, the PDU session of the UE1 is still used from the network-side device (such as the base station) to the core network. Because the PDU session remains unchanged, a path from the network-side device (such as the base station) to the core network remains unchanged, and there are two branches: (1) In a case that a PDCP bearer of the aggregate bearer and a PDCP bearer of a non-aggregate bearer are located on different terminals, if the reconfiguration occurs, because the PDCP bearer is changed, operations such as PDCP reestablishment and security update need to be performed in this case. In addition, to maintain lossless transmission of acknowledged mode (AM) data, sequence number (SN) status transfer and data forwarding of an AM PDCP entity need to be performed between a PDCP source anchor UE and a PDCP target anchor UE, to keep data transmission really lossless; but for unacknowledged mode (UM) data, because a requirement for getting absolutely lossless is not high, data forwarding can be optionally performed, starting from resetting an initial value of a PDCP SN status to zero. (2) In a case that the PDCP bearer of the aggregate bearer and the PDCP bearer of the non-aggregate bearer are located on a same terminal, if the reconfiguration occurs, because the PDCP bearer is not changed, it is unnecessary to perform operations such as PDCP reestablishment and security update, and it is only necessary to perform a PDCP data recovery process, to recover data in different paths.

In another case, a core network connection corresponding to the bearer needs to be switched. This case refers to a case that the core network connection changes before and after an aggregate bearer is configured, or after an aggregate bearer configuration and cancellation of the aggregate bearer configuration. For example, the UE1 initiates a service connection, uses its own PDU session, then reconfigures a multi-device aggregate bearer, and still maintains a PDU session of the UE1. Then because a condition of the aggregate bearer is not satisfied, only a UE2 bearer is configured again. In this case, a PDU session of the UE2 needs to be used from the network-side device (such as the base station) to the core network, and the PDU session is changed. There are also two processing methods: (1) Because a core network path has been changed, regardless of whether the PDCP bearer is changed, all state variables (including AM and UM) can be reset to zero. Starting from initialization, data receiving/sending is performed again in a new entity, causing a problem that AM data cannot be completely lossless. This behavior is explicitly indicated by the network side to the UE (because an existing AM reconfiguration or switching is to maintain an SN status; in this case, an AM SN needs to be reset to zero, which is a new behavior and needs to be explicitly indicated). (2) The core network also performs status transfer between old and new paths to ensure that the new PDU session can continue from the old PDU session for data processing, so that a status of PDCP can be maintained. In a case that the PDCP bearer is not changed, only PDCP data recovery needs to be performed. In a case that the PDCP bearer is changed, PDCP reestablishment is performed. In this case, SN status transfer and data forwarding can be performed on AM data at a source UE node and a target UE node, and data forwarding can be optionally performed on UM data.

Optionally, in the transmission configuration method in this embodiment of this application, the method may further include the following content:

in a case that the second terminal device is handed over from the first access network device to a third access network device, de-configuring, by the first access network device, the bearer-related information. In this embodiment, due to movement of terminals, for example, two terminals are originally under control of one network-side device (such as a base station), while one terminal gradually moves away from the control of the network-side device (such as the base station). This needs to be avoided because multi-terminal aggregation between network-side devices (such as base stations) involves a lot of inter-base-station interface interaction. Therefore, once a terminal leaves the network-side device (such as the base station), an aggregate bearer is abandoned.

Optionally, in the transmission configuration method in this embodiment of this application, in a case that the first terminal device satisfies a condition for handover from the first access network device to a fourth access network device, the method further includes one of the following:

(1) If there are a plurality of remaining terminal devices after the first terminal device is excluded from a plurality of terminal devices, the first access network device reconfigures corresponding bearers for the remaining terminal devices to perform cooperative transmission.

(2) If there is one remaining terminal device after the first terminal device is excluded from a plurality of terminal devices, the first access network device reconfigures a bearer of the remaining terminal device as a third bearer type, where the third bearer type is presence of a PDCP bearer and an RLC bearer in a same terminal device, for example, the UE1 bearer or the UE2 bearer shown in FIG. 4, that is, an ordinary bearer. The PDCP bearer and the RLC bearer are both located in the same UE, and the PDCP bearer formed by a PDCP layer and an SDAP layer is located in the UE1 or the UE2.

(3) The first access network device sends, to the fourth access network device, a first handover request message corresponding to the first terminal device, where the first handover request message includes at least one of the bearer-related information or core network user plane connection information corresponding to the first terminal device.

In this embodiment, in a case that a multi-terminal aggregate/cooperative bearer exists, that is, in a case that the split bearer or UE1-UE2 bearer type is configured between a plurality of UEs, if UE handover occurs, the following scenarios may be included:

(1) Only one or some of the UEs satisfy a handover condition, but other UEs do not. In this case, the multi-terminal split bearer or UE1-UE2 bearer type can be reconfigured, and the UE that needs to be handed over is removed.

(2) If remaining UEs are not enough to form an aggregate bearer configuration after the UE to be handed over is removed, for example, there is only one remaining UE, the bearer can be reconfigured as an ordinary bearer.

(3) If one or some of the UEs satisfy the handover condition, this group of UEs can be handed over together. A source network-side device (such as a base station) sends handover request messages of the group of UEs to a target network-side device (such as a base station), where the handover request messages include a multi-terminal aggregate/cooperative bearer configuration, so that the target network-side device (such as the base station) generates a new aggregate/cooperative bearer configuration for this group of UEs. In addition, the source network-side device notifies the target network-side device (such as the base station) of PDU session information, for example, to which UE a PDU session belongs, so that the target network-side device (such as the base station) performs the configuration. Certainly, in a case that the target network-side device (such as the base station) determines to perform the configuration, the aggregate/cooperative bearer may alternatively be removed and an ordinary bearer is configured, or a PDU session corresponding to a bearer is changed.

(4) If primary UE satisfies the handover condition, where the primary UE is defined as UE to which a PDU session belongs, this group of UEs can be handed over together. A source network-side device (such as a base station) sends handover request messages of the primary UE together with other UEs to a target network-side device (such as a base station), where the handover request messages include a multi-terminal aggregate/cooperative bearer configuration, so that the target network-side device (such as the base station) generates a new aggregate/cooperative bearer configuration for this group of UEs. In addition, the source network-side device notifies the target network-side device (such as the base station) of PDU session information, or the primary UE has the PDU session by default, so that the target network-side device (such as the base station) performs the configuration. Certainly, in a case that the target network-side device (such as the base station) determines to perform the configuration, the aggregate/cooperative bearer may alternatively be removed and an ordinary bearer is configured, or a PDU session corresponding to a bearer is changed.

Optionally, in the transmission configuration method in this embodiment of this application, in a case that a core network user plane connection corresponding to the first terminal device is switched from a first core network user plane connection to a second core network user plane connection, the method further includes: the first access network device places data to be transmitted based on a user plane path corresponding to the second core network user plane connection, after a last endmarker of data to be transmitted based on a user plane path corresponding to the first core network user plane connection.

In this embodiment, regardless of a multi-UE split bearer or a cross-UE bearer such as the UE1-UE2 bearer, a prerequisite is that a core network user plane (UP) part corresponding to this bearer is unified, for example, associated with only one of the UEs. In a case that the bearer is changed, the core network UP part may need to be reconfigured, for example, reconfigured from an original UE1 PDU session to a UE2 PDU session, and the service data needs to be continuous. In this reconfiguration process, an original UP path is a GPRS tunneling protocol (GTP) tunnel 1 between a gNB and a UE1 UPF, and after receiving a data packet carrying an endmarker, the network-side device (such as the base station) starts to process data of a GTP tunnel 2 between the gNB and a UE2 UPF in the new UP path. This means that the data in the new path is placed in order after a last endmarker of data in the original path for processing, to satisfy an in-order processing principle.

Optionally, in the transmission configuration method in this embodiment of this application, in a case that the first terminal device and the second terminal device correspond to different core network user plane connections, the bearer-related information is further used to indicate the following: that the first terminal device is to send, to the second terminal device, a first receiving/sending state that is corresponding to a received part and/or a sent part and for cooperative transmission, where the first receiving/sending state is used for the second terminal device to continue transmission of an unreceived part and/or an unsent part with a core network device; and that the first terminal device is to maintain or reset a receiving/sending state.

Optionally, in the transmission configuration method in this embodiment of this application, in a case that the first terminal device and the second terminal device correspond to different core network user plane connections, before the step in which the first access network device sends the bearer-related information to the first terminal device, the method further includes: receiving, by the first access network device, a second request sent by the first terminal device or the second terminal device, where the bearer-related information is a response to the second request, and the bearer-related information is further used to instruct the first terminal device to send a transmission configuration and a receiving/sending state that are for cooperative transmission to the second terminal device.

Optionally, in the transmission configuration method in this embodiment of this application, in a case that the first terminal device and the second terminal device correspond to different core network user plane connections, the method further includes: the first access network device receives a third request sent by the first terminal device or the second terminal device; and the first access network device sends second information to the second terminal device in response to the third request, where the second information is used to indicate one of: that the second terminal device is to initialize a layer 2 (L2) status; that the second terminal device is to obtain an L2 status from the first terminal device; a core network configuration established for the second terminal device, and that data of a core network user plane connection corresponding to the second terminal device is located after data of a core network user plane connection corresponding to the first terminal device; or an access network configuration established for the second terminal device and all receiving/sending states for cooperative transmission by the first terminal device.

In this embodiment, the access network side does not perform aggregate bearer processing of two or more UEs, but separately processes a bearer and PDU session of each UE. In this case, if a receiving/sending state of the UE1 needs to be synchronized to the UE2 as soon as possible, and continuous reception is performed on the UE2, feasible modes are as follows:

Mode 1: Requesting Continuity from the Core Network

In this mode 1, the UE1 is receiving data, and at a moment when determining to continue reception at the UE2, transmits all its receiving states to the UE2 through a UE-UE interface, such as PC5, WLAN, or Bluetooth; and the UE2 receives all the receiving states of the UE1, and requests subsequent continuous data from the core network according to a current receiving state. For example, a user listens to a song on a mobile phone for 2 minutes and 18 seconds and transmits this moment to a smart band, and the smart band requests the network side to continue playing from 2 minutes and 18 seconds of the song, so that the smart band can continue to provide the user with continuous experience; and the receiving state of the UE1 is suspended or reset.

Mode 2: Requesting Continuity from the Access Network

In this mode 2, the UE1 is receiving data and is ready to continue its receiving state at the UE2. The UE1 or UE2 may request the continuity behavior from the network. The request may be based on a DRB or a QoS flow or another service. If the request is approved, all current configurations and receiving/sending states of the UE1 that are related to the request are transmitted to the UE2 through a UE-UE interface; or the network side sends the configurations to the UE2, and a status of the UE2 starts from initialization or a status of the UE2 comes from the UE1. When requested by the UE1 or the UE2, the network side needs to establish a related core network configuration for the UE2, such as a PDU session, and arrange data of a PDU session of the UE1 and a PDU session of the UE2 sequentially, and then data after an endmarker of data in the PDU session of the UE1 is transmitted to the network-side device (such as the base station) to achieve a continuous state. When requested by the UE1 or the UE2, the network side needs to establish a related access network configuration for the UE2, and copy all receiving/sending states of the UE1 to the UE2 for continuous transmission.

For example, if the service is in UM mode, new SN statuses corresponding to the UE2 and the network side may all start from an initial value, for example, start from SN=0. A transmit end starts sending, on a new link, a first piece of data that has not been sent. For example, data SN=99 has been transmitted between the UE1 and the network, but data 100 and subsequent data are not sent. In this case, transmission is continued by switching to a path between the UE2 and the network. In this case, the first piece of data to be sent on the new link is a previous data packet numbered 100, but an SN of this data packet on the new link is numbered again from the initial value, that is, SN=0. If the service is in AM mode, a most lossless mode is to transfer all L2 SN receiving/sending states of the UE1 to the UE2 through the UE-UE interface, and the network side also transfers the L2 SN status of the UE1 to the UE2. This means that all receiving/sending states between the UE1 and the network side are copied as between the UE2 and the network side. In addition, after the new link between the UE2 and the network side is established, an L2 status report needs to be sent to notify each other of the receiving states, so that retransmission and continuity are performed. L2 may be RLC or PDCP, or RLC and PDCP. For example, the receiving state on the original link is that data packets 1, 2, 3, 5, and 7 are successfully received, a status report is sent from the receive end to the transmit end, and the transmit end retransmits data packets 4 and 6 and continues to transmit data packets 8, 9, 10 . . . . In this way, the data packets can be completely lossless. If the data is in AM mode and no status report is triggered, alternatively, after the UE2 and the network side have copied the receiving/sending state, the transmit end may start to perform retransmission sequentially based on a first data packet whose ACK is not received. For example, an original link of the transmit end sends data packets 1-10, and ACKs of the first 8 data packets are received. In this case, the transmit end sends data packets directly from data packets 9, 10, 11 . . . . If the receive end receives duplicate data packets, the receive end deletes the duplicate data packets. For example, data packets 9 and 10 are actually received but ACKs are not fed back in time. In this case, the data packets 9 and 10 are received again, and duplicate packets can be deleted. If the data is AM mode data but is not required to be highly lossless or forwarding of all states is not expected for simplicity, L2 SN statuses may alternatively all start from the initial value. Data packets sent by the transmit end on the new link may be transmitted starting from the first data packet whose ACK is not obtained on the original link. For example, if the original link of the transmit end has sent data packets 1-10, and ACKs of the first 8 data packets have been received, the transmit end sends data packets directly from data packets 9, 10, 11, . . . , and new SN numbers are 0, 1, 2 . . . . The receive end cannot determine duplicate data packets, but processes the data packets sequentially. If the data is AM mode data but is not required to be highly lossless or forwarding of all states is not expected for simplicity, L2 SN statuses may alternatively all start from the initial value. Data packets sent by the transmit end on the new link may be transmitted starting from the first data packet that is not sent on the original link. For example, if the original link of the transmit end has sent data packets 1-10, the transmit end sends data packets directly from data packets 11, 12, 13, . . . , and new SN numbers are 0, 1, 2 . . . . The receive end cannot determine duplicate data packets, but processes the data packets sequentially.

It can be learned from the foregoing that in the transmission configuration method in this embodiment of this application, the core network can establish a same user plane connection (such as a PDU session) for two or more terminal devices, or establish user plane connections for two or more terminal devices separately. When a service needs to be switched between different terminal devices, a current service transmission status is transferred between a source terminal device and a target terminal device through the interface between the terminal devices, to achieve a purpose of continuous reception. This embodiment of this application supports the reconfiguration process of the PDCP bearer and the path switching process of the bearer, and supports SN status transfer and data forwarding between the source terminal device and the target terminal device, to satisfy service continuity and optional lossless requirements. The core network, the access network (such as the base station), and the UE can determine bearer requirements of different services in a manner of subscription, preconfiguration, setting, or interaction.

Figure 6:
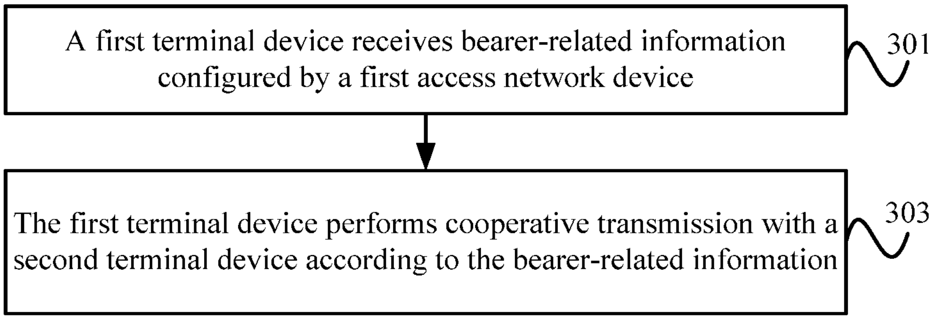
FIG. 6 is a schematic flowchart of another transmission configuration method according to an embodiment of this application.

Referring to FIG. 6, an embodiment of this application provides a transmission configuration method. The method includes the following steps.

Step 301: A first terminal device receives bearer-related information configured by a first access network device.

Step 303: The first terminal device performs cooperative transmission with a second terminal device according to the bearer-related information.

In this embodiment of this application, the first terminal device may perform cooperative transmission with the second terminal device according to the bearer-related information configured for the first terminal device by the first access network device corresponding to the first terminal device, where the second terminal device includes at least one terminal device other than the first terminal device. In this way, at least two terminal devices can implement cooperative transmission between a plurality of terminal devices according to the bearer-related information configured by the network side for each terminal device, thereby implementing continuous transmission between the at least two terminal devices and ensuring service experience of the terminal devices and system efficiency.

Optionally, in the transmission configuration method in this embodiment of this application, the bearer-related information includes one of: a packet data convergence protocol PDCP bearer; a radio link control RLC bearer; or a PDCP bearer and an RLC bearer.

Optionally, in the transmission configuration method in this embodiment of this application, the bearer-related information includes: RLC bearers corresponding to PC5 interfaces of the first terminal device and the second terminal device.

Optionally, in the transmission configuration method in this embodiment of this application, the bearer-related information further includes at least one of: a correspondence between an RLC bearer corresponding to a PC5 interface of the first terminal device and an RLC bearer corresponding to a Uu interface of the first terminal device; or a correspondence between an RLC bearer corresponding to a PC5 interface of the first terminal device and a PDCP bearer corresponding to a Uu interface of the first terminal device.

Optionally, in the transmission configuration method in this embodiment of this application, in a case that the PDCP bearer is located in the first terminal device, the step in which the first terminal device performs cooperative transmission with the second terminal device according to the bearer-related information includes at least one of:

(1) the first terminal device performs split transmission from the PDCP bearer to a plurality of RLC bearers;

(2) the first terminal device performs duplication transmission from the PDCP bearer to a plurality of RLC bearers;

(3) the first terminal device transmits data to the second terminal device through an RLC bearer corresponding to a PC5 interface of the first terminal device;

(4) the first terminal device maps an RLC bearer corresponding to the first terminal device to the PDCP bearer, and performs reception processing; or (5) the first terminal device maps an RLC bearer corresponding to a PC5 interface of the second terminal device to the PDCP bearer, and performs reception processing.

Optionally, in the transmission configuration method in this embodiment of this application, in a case that the PDCP bearer is located in the second terminal device, the step in which the first terminal device performs cooperative transmission with the second terminal device according to the bearer-related information includes at least one of:

(1) the first terminal device maps an RLC bearer corresponding to a PC5 interface of the second terminal device to an RLC bearer corresponding to the first terminal device, and performs reception processing; or (2) the first terminal device sends data received by an RLC bearer corresponding to the first terminal device to the second terminal device through an RLC bearer corresponding to a PC5 interface of the first terminal device.

Optionally, in the transmission configuration method in this embodiment of this application, the first terminal device satisfies at least one of: a preset subscription condition; reporting a user's terminal service usage preference; having a same setting or status requirement for a same terminal application as another terminal device in a plurality of terminal devices; being in a synchronous receiving state for a same terminal application with another terminal device in a plurality of terminal devices; or a condition for communication with another terminal device in a plurality of terminal devices.

Optionally, in the transmission configuration method in this embodiment of this application, before step 301, the method further includes: the first terminal device sends a first request to the first access network device, where the first request carries at least one of: an identifier of the second terminal device; a correspondence between first service data and a bearer type; or link quality between the first terminal device and the second terminal device.

Optionally, in the transmission configuration method in this embodiment of this application, the step in which the first terminal device sends the first request to the first access network device includes: the first terminal device sends the first request to the first access network device in a case that at least one of the following is satisfied: support of the first access network device for configuring the bearer-related information for the first terminal device; or a first condition configured by the first access network device, where the first condition includes at least one of: link quality between the first terminal device and the second terminal device being higher than a first quality threshold, or cooperative transmission of specific service data being performed between the first terminal device and the second terminal device.

Optionally, in the transmission configuration method in this embodiment of this application, the step in which the first terminal device sends the first request to the first access network device includes: the first terminal device sends the first request to the first access network device by using dedicated radio resource control RRC signaling.

Optionally, in the transmission configuration method in this embodiment of this application, the method further includes: the first terminal device receives first configuration signaling sent by the first access network device; and the first terminal device configures or reconfigures a bearer according to the first configuration signaling.

Optionally, in the transmission configuration method in this embodiment of this application, the method further includes: in a case that the first terminal device and the second terminal device are within coverage of different access network devices, the first terminal device hands over itself to a second access network device corresponding to the second terminal device; the first terminal device receives second configuration signaling sent by the second access network device; and the first terminal device reconfigures a bearer according to the second configuration signaling.

Optionally, in the transmission configuration method in this embodiment of this application, the method further includes: the first terminal device receives the bearer-related information reconfigured by the first access network device; and the first terminal device performs cooperative transmission with the second terminal device according to the reconfigured bearer-related information.

Optionally, in the transmission configuration method in this embodiment of this application, the method further includes one of: that the first terminal device performs PDCP reestablishment, and/or performs a first operation on a PDCP bearer according to the reconfigured bearer-related information, where the first operation includes at least one of reestablishment or security update; that the first terminal device performs PDCP data recovery according to the reconfigured bearer-related information; or that the first terminal device resets all state variables according to the reconfigured bearer-related information.

Optionally, in the transmission configuration method in this embodiment of this application, the method further includes: in a case that the second terminal device is handed over from the first access network device to a third access network device, the first terminal device de-configures the bearer-related information.

Optionally, in the transmission configuration method in this embodiment of this application, in a case that the first terminal device and the second terminal device correspond to different core network user plane connections, the method further includes: sending, by the first terminal device to the second terminal device according to the bearer-related information, a first receiving/sending state that is corresponding to a received part and/or a sent part and for cooperative transmission, where the first receiving/sending state is used for the second terminal device to continue transmission of an unreceived part and/or an unsent part with a core network device; and that the first terminal device maintains or resets a receiving/sending state.

Optionally, in the transmission configuration method in this embodiment of this application, in a case that the first terminal device and the second terminal device correspond to different core network user plane connections, the method further includes: the first terminal device sends a transmission configuration and a receiving/sending state that are for cooperative transmission to the second terminal device according to the bearer-related information, where the bearer-related information is used to respond to a second request sent by the first terminal device or the second terminal device to the first access network device.

Optionally, in the transmission configuration method in this embodiment of this application, in a case that the first terminal device and the second terminal device correspond to different core network user plane connections, the method further includes: the first terminal device receives first information sent by the first access network device, where the first information is used to respond to a third request sent by the first terminal device or the second terminal device to the first access network device, and the first information is used to indicate one of: that the first terminal device is to initialize an L2 status; that the first terminal device is to obtain an L2 status from the second terminal device; a core network configuration corresponding to the first terminal device, and that data of a core network user plane connection corresponding to the first terminal device is located after data of a core network user plane connection corresponding to the second terminal device; or an access network configuration corresponding to the first terminal device and all receiving/sending states for cooperative transmission by the second terminal device.

It should be noted that, for same or similar content in the transmission configuration method in this embodiment of this application and the transmission configuration method performed by the network-side device, reference may be made to the corresponding content in the embodiment of the transmission configuration method performed by the network-side device in FIG. 3 to FIG. 5. Details are not described herein again.

It should be noted that the transmission configuration method performed by the network-side device provided in this embodiment of this application may be performed by a transmission configuration apparatus, or a control module configured to perform the transmission configuration method in the transmission configuration apparatus. A transmission configuration apparatus provided in an embodiment of this application is described by assuming that the transmission configuration apparatus performs the transmission configuration method in this embodiment of this application.

Figure 7:
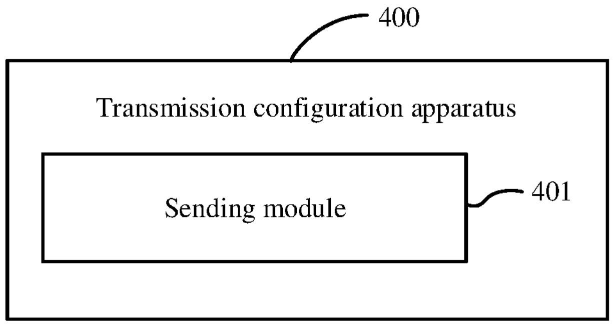
FIG. 7 is a schematic diagram of a structure of a transmission configuration apparatus according to an embodiment of this application.

Referring to FIG. 7, an embodiment of this application provides a transmission configuration apparatus 400, applied to a network-side device. The transmission configuration apparatus 400 includes a sending module 401, configured to send bearer-related information to a first terminal device, where the bearer-related information is used to instruct the first terminal device to perform cooperative transmission with a second terminal device.

Optionally, in the transmission configuration apparatus 400 in this embodiment of this application, the bearer-related information includes one of: a packet data convergence protocol PDCP bearer; a radio link control RLC bearer; or a PDCP bearer and an RLC bearer.

Optionally, in the transmission configuration apparatus 400 in this embodiment of this application, the bearer-related information includes: RLC bearers corresponding to PC5 interfaces of the first terminal device and the second terminal device.

Optionally, in the transmission configuration apparatus 400 in this embodiment of this application, the bearer-related information further includes at least one of: a correspondence between an RLC bearer corresponding to a PC5 interface of the first terminal device and an RLC bearer corresponding to a Uu interface of the first terminal device; or a correspondence between an RLC bearer corresponding to a PC5 interface of the first terminal device and a PDCP bearer corresponding to a Uu interface of the first terminal device.

Optionally, in the transmission configuration apparatus 400 in this embodiment of this application, the first terminal device satisfies at least one of: a preset subscription condition; reporting a user's terminal service usage preference; having a same setting or status requirement for a same terminal application as the second terminal device; synchronously receiving service data of a same terminal application with the second terminal device; or a preset condition for communication with the second terminal device.

Optionally, the transmission configuration apparatus 400 in this embodiment of this application may further include a receiving module, configured to: before the bearer-related information is sent to the first terminal device, receive a first request, where the first request carries at least one of: an identifier of the second terminal device; a correspondence between service data and a bearer type; or link quality between the first terminal device and the second terminal device.

Optionally, in the transmission configuration apparatus 400 in this embodiment of this application, the receiving module is configured to perform one of: receiving the first request sent by a core network device; or receiving the first request sent by the first terminal device, where the first request is carried in dedicated radio resource control RRC signaling.

Optionally, in the transmission configuration apparatus 400 in this embodiment of this application, the receiving module may be configured to receive the first request sent by the first terminal device in a case that at least one of the following is satisfied: support of the first access network device for configuring the bearer-related information for the first terminal device; or a first condition configured by the first access network device, where the first condition includes at least one of: link quality between the first terminal device and the second terminal device being higher than a first quality threshold, or cooperative transmission of specific service data being performed between the first terminal device and the second terminal device.

Optionally, in the transmission configuration apparatus 400 in this embodiment of this application, the sending module 401 is further configured to perform at least one of: sending first configuration signaling to the first terminal device, where the first configuration signaling is used to instruct to configure or reconfigure a bearer of the first terminal device; in a case that the second terminal device enters an RRC_connected state and is within coverage of a same access network device as the first terminal device, sending second configuration signaling to the second terminal device, where the second configuration signaling is used to instruct to configure or reconfigure a bearer of the second terminal device; in a case that the second terminal device is not in an RRC_connected state, paging the second terminal device, and after the second terminal device enters the RRC_connected state, sending third configuration signaling to the second terminal device, where the third configuration signaling is used to instruct to configure or reconfigure a bearer of the second terminal device; in a case that the first terminal device and the second terminal device are within coverage of different access network devices, after the second terminal device is handed over to coverage of the first access network device, sending fourth configuration signaling to the second terminal device, where the fourth configuration signaling is used to instruct to configure or reconfigure a bearer of the second terminal device; or in a case that the first terminal device and the second terminal device are within coverage of different access network devices, sending fifth configuration signaling to a second access network device corresponding to the second terminal device, where the fifth configuration signaling is used to instruct the second access network device to configure or reconfigure a bearer of the second terminal device.

Optionally, in the transmission configuration apparatus 400 in this embodiment of this application, the sending module 401 may be further configured to reconfigure the bearer-related information.

Optionally, in the transmission configuration apparatus 400 in this embodiment of this application, the sending module 401 may be configured to perform at least one of: in a case that an answer mode of a user corresponding to the first terminal device is changed, reconfiguring the bearer-related information; or in a case that link quality between the first terminal device and the second terminal device is higher than a second quality threshold, reconfiguring the bearer-related information.

Optionally, in the transmission configuration apparatus 400 in this embodiment of this application, the reconfigured bearer-related information is used to indicate at least one of: that in a case that a PDCP bearer is changed, the first terminal device is to perform a first operation on the PDCP bearer, where the first operation includes at least one of reestablishment or security update; that in a case that a PDCP bearer is not changed, the first terminal device is to perform PDCP data recovery; or that the first terminal device is to reset all state variables.

Optionally, the transmission configuration apparatus 400 in this embodiment of this application may further include a processing module, configured to de-configure the bearer-related information in a case that the second terminal device is handed over from the first access network device to a third access network device.

Optionally, in the transmission configuration apparatus 400 in this embodiment of this application, the sending module 401 may be further configured to: in a case that the first terminal device satisfies a condition for handover from the first access network device to a fourth access network device, perform one of: if there are a plurality of remaining terminal devices after the first terminal device is excluded from a plurality of terminal devices, reconfiguring corresponding bearers for the remaining terminal devices to perform cooperative transmission; if there is one remaining terminal device after the first terminal device is excluded from a plurality of terminal devices, reconfiguring a bearer of the remaining terminal device as a third bearer type, where the third bearer type is presence of a PDCP bearer and an RLC bearer in a same terminal device; or sending to the fourth access network device, a first handover request message corresponding to the first terminal device, where the first handover request message includes at least one of the bearer-related information or core network user plane connection information corresponding to the first terminal device.

Optionally, in the transmission configuration apparatus 400 in this embodiment of this application, the processing module may be further configured to: in a case that a core network user plane connection corresponding to the first terminal device is switched from a first core network user plane connection to a second core network user plane connection, place data to be transmitted based on a user plane path corresponding to the second core network user plane connection, after a last endmarker of data to be transmitted based on a user plane path corresponding to the first core network user plane connection.

Optionally, in the transmission configuration apparatus 400 in this embodiment of this application, in a case that the first terminal device and the second terminal device correspond to different core network user plane connections, the bearer-related information is further used to indicate the following: that the first terminal device is to send, to the second terminal device, a first receiving/sending state that is corresponding to a received part and/or a sent part and for cooperative transmission, where the first receiving/sending state is used for the second terminal device to continue transmission of an unreceived part and/or an unsent part with a core network device; and that the first terminal device is to maintain or reset a receiving/sending state.

Optionally, in the transmission configuration apparatus 400 in this embodiment of this application, the receiving module may be further configured to: in a case that the first terminal device and the second terminal device correspond to different core network user plane connections, before the bearer-related information is sent to the first terminal device, receive a second request sent by the first terminal device or the second terminal device, where the bearer-related information is a response to the second request, and the bearer-related information is further used to instruct the first terminal device to send a transmission configuration and a receiving/sending state that are for cooperative transmission to the second terminal device.

Optionally, in the transmission configuration apparatus 400 in this embodiment of this application, the receiving module may be further configured to: in a case that the first terminal device and the second terminal device correspond to different core network user plane connections, receive a third request sent by the first terminal device or the second terminal device; and the sending module 401 may be further configured to send second information to the second terminal device in response to the third request, where the second information is used to indicate one of: that the second terminal device is to initialize an L2 status; that the second terminal device is to obtain an L2 status from the first terminal device; a core network configuration established for the second terminal device, and that data of a core network user plane connection corresponding to the second terminal device is located after data of a core network user plane connection corresponding to the first terminal device; or an access network configuration established for the second terminal device and all receiving/sending states for cooperative transmission by the first terminal device.

In this embodiment of this application, the first access network device configures corresponding bearer-related information for each of a plurality of terminal devices separately. In this case, corresponding bearer-related information can be configured for any one of the plurality of terminal devices, that is, the first terminal device, so that the first terminal device can perform cooperative transmission with the second terminal device according to the bearer-related information, where the second terminal device includes at least one terminal device other than the first terminal device. Therefore, configuring bearer-related information enables at least two terminal devices to perform cooperative transmission, so that continuous transmission is implemented between the at least two terminal devices, thereby ensuring service experience of the terminal devices and system efficiency.

The transmission configuration apparatus in this embodiment of this application may be a network-side device, or may be a component, an integrated circuit, or a chip in a network-side device. The apparatus may be a network-side device. For example, the network-side device may include but is not limited to the foregoing types of the network-side device 12.

The transmission configuration apparatus in this embodiment of this application may be an apparatus having an operating system. The operating system may be an Android operating system, an iOS operating system, or other possible operating systems, and is not limited in this embodiment of this application.

The transmission configuration apparatus provided in this embodiment of this application can implement each process implemented by the method embodiment in FIG. 3, with the same technical effect achieved. To avoid repetition, details are not described herein again.

It should be noted that, the transmission configuration method performed by the terminal device provided in this embodiment of this application may be performed by a transmission configuration apparatus, or a control module configured to perform the transmission configuration method in the transmission configuration apparatus. A transmission configuration apparatus provided in an embodiment of this application is described by assuming that the transmission configuration apparatus performs the transmission configuration method in this embodiment of this application.

Figure 8:
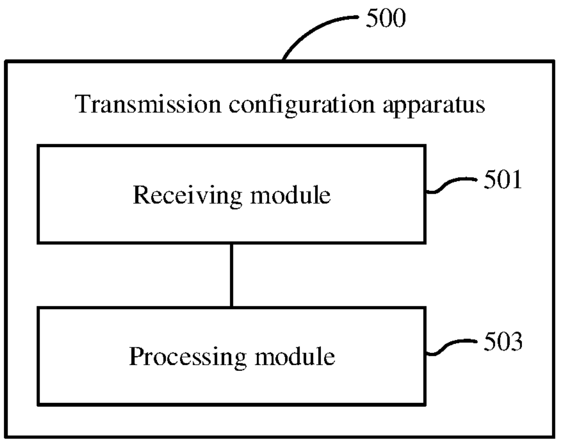
FIG. 8 is a schematic diagram of a structure of another transmission configuration apparatus according to an embodiment of this application.

Referring to FIG. 8, an embodiment of this application provides a transmission configuration apparatus 500, applied to a terminal device. The transmission configuration apparatus 500 includes a receiving module 501 and a processing module 503.

The receiving module 501 is configured to receive bearer-related information configured by a first access network device; and the processing module 503 is configured to perform cooperative transmission with a second terminal device according to the bearer-related information.

Optionally, in the transmission configuration apparatus 500 in this embodiment of this application, the bearer-related information includes one of: a packet data convergence protocol PDCP bearer; a radio link control RLC bearer; or a PDCP bearer and an RLC bearer.

Optionally, in the transmission configuration apparatus 500 in this embodiment of this application, the bearer-related information includes: RLC bearers corresponding to PC5 interfaces of the first terminal device and the second terminal device.

Optionally, in the transmission configuration apparatus 500 in this embodiment of this application, the bearer-related information further includes at least one of: a correspondence between an RLC bearer corresponding to a PC5 interface of the first terminal device and an RLC bearer corresponding to a Uu interface of the first terminal device; or a correspondence between an RLC bearer corresponding to a PC5 interface of the first terminal device and a PDCP bearer corresponding to a Uu interface of the first terminal device.

Optionally, in the transmission configuration apparatus 500 in this embodiment of this application, in a case that the PDCP bearer is located in the first terminal device, the processing module 503 is configured to perform at least one of: performing split transmission from the PDCP bearer to a plurality of RLC bearers; performing duplication transmission from the PDCP bearer to a plurality of RLC bearers; transmitting data to the second terminal device through an RLC bearer corresponding to a PC5 interface of the first terminal device; mapping an RLC bearer corresponding to the first terminal device to the PDCP bearer, and performing reception processing; or mapping an RLC bearer corresponding to a PC5 interface of the second terminal device to the PDCP bearer, and performing reception processing.

Optionally, in the transmission configuration apparatus 500 in this embodiment of this application, in a case that the PDCP bearer is located in the second terminal device, the processing module 503 is configured to perform at least one of: mapping an RLC bearer corresponding to a PC5 interface of the second terminal device to an RLC bearer corresponding to the first terminal device, and performing reception processing; or sending data received by an RLC bearer corresponding to the first terminal device to the second terminal device through an RLC bearer corresponding to a PC5 interface of the first terminal device.

Optionally, in the transmission configuration apparatus 500 in this embodiment of this application, the first terminal device satisfies at least one of: a preset subscription condition; reporting a user's terminal service usage preference; having a same setting or status requirement for a same terminal application as another terminal device in a plurality of terminal devices; being in a synchronous receiving state for a same terminal application with another terminal device in a plurality of terminal devices; or a condition for communication with another terminal device in a plurality of terminal devices.

Optionally, the transmission configuration apparatus 500 in this embodiment of this application may further include a sending module, configured to: before the bearer-related information configured by the first access network device is received, send a first request to the first access network device, where the first request carries at least one of: an identifier of the second terminal device; a correspondence between first service data and a bearer type; or link quality between the first terminal device and the second terminal device.

Optionally, in the transmission configuration apparatus 500 in this embodiment of this application, the sending module may be configured to send the first request to the first access network device in a case that at least one of the following is satisfied: support of the first access network device for configuring the bearer-related information for the first terminal device; or a first condition configured by the first access network device, where the first condition includes at least one of: link quality between the first terminal device and the second terminal device being higher than a first quality threshold, or cooperative transmission of specific service data being performed between the first terminal device and the second terminal device.

Optionally, in the transmission configuration apparatus 500 in this embodiment of this application, the sending module may be configured to send the first request to the first access network device by using dedicated radio resource control RRC signaling.

Optionally, in the transmission configuration apparatus 500 in this embodiment of this application, the receiving module 501 may be further configured to receive first configuration signaling sent by the first access network device; and the processing module 503 may be further configured to configure or reconfigure a bearer according to the first configuration signaling.

Optionally, in the transmission configuration apparatus 500 in this embodiment of this application, the processing module 503 may be further configured to: in a case that the first terminal device and the second terminal device are within coverage of different access network devices, hand over the first terminal device to a second access network device corresponding to the second terminal device; the receiving module 501 may be further configured to receive second configuration signaling sent by the second access network device; and the processing module 503 may be further configured to reconfigure a bearer according to the second configuration signaling.

Optionally, in the transmission configuration apparatus 500 in this embodiment of this application, the receiving module 501 may be further configured to receive the bearer-related information reconfigured by the first access network device; and the processing module 503 may be configured to perform cooperative transmission with the second terminal device according to the reconfigured bearer-related information.

Optionally, in the transmission configuration apparatus 500 in this embodiment of this application, the processing module 503 may be further configured to perform one of: performing PDCP reestablishment, and/or performing a first operation on a PDCP bearer according to the reconfigured bearer-related information, where the first operation includes at least one of reestablishment or security update; performing PDCP data recovery according to the reconfigured bearer-related information; or resetting all state variables according to the reconfigured bearer-related information.

Optionally, in the transmission configuration apparatus 500 in this embodiment of this application, the processing module 503 may be further configured to de-configure the bearer-related information in a case that the second terminal device is handed over from the first access network device to a third access network device.

Optionally, in the transmission configuration apparatus 500 in this embodiment of this application, the sending module may be further configured to: in a case that the first terminal device and the second terminal device correspond to different core network user plane connections, send, to the second terminal device according to the bearer-related information, a first receiving/sending state that is corresponding to a received part and/or a sent part and for cooperative transmission, where the first receiving/sending state is used for the second terminal device to continue transmission of an unreceived part and/or an unsent part with a core network device; and the processing module 503 may be further configured to maintain or reset a receiving/sending state.

Optionally, in the transmission configuration apparatus 500 in this embodiment of this application, the sending module may be further configured to: in a case that the first terminal device and the second terminal device correspond to different core network user plane connections, send a transmission configuration and a receiving/sending state that are for cooperative transmission to the second terminal device according to the bearer-related information, where the bearer-related information is used to respond to a second request sent by the first terminal device or the second terminal device to the first access network device.

Optionally, in the transmission configuration apparatus 500 in this embodiment of this application, the receiving module 501 may be further configured to: in a case that the first terminal device and the second terminal device correspond to different core network user plane connections, receive first information sent by the first access network device, where the first information is used to respond to a third request sent by the first terminal device or the second terminal device to the first access network device, and the first information is used to indicate one of: that the first terminal device is to initialize an L2 status; that the first terminal device is to obtain an L2 status from the second terminal device; a core network configuration corresponding to the first terminal device, and that data of a core network user plane connection corresponding to the first terminal device is located after data of a core network user plane connection corresponding to the second terminal device; or an access network configuration corresponding to the first terminal device and all receiving/sending states for cooperative transmission by the second terminal device.

In this embodiment of this application, the first terminal device may perform cooperative transmission with the second terminal device according to the bearer-related information configured for the first terminal device by the first access network device corresponding to the first terminal device, where the second terminal device includes at least one terminal device other than the first terminal device. In this way, at least two terminal devices can implement cooperative transmission between a plurality of terminal devices according to the bearer-related information configured by the network side for each terminal device, thereby implementing continuous transmission between the at least two terminal devices and ensuring service experience of the terminal devices and system efficiency.

The transmission configuration apparatus in this embodiment of this application may be a terminal device, or may be a component, an integrated circuit, or a chip in a terminal device. The apparatus may be a mobile terminal, or may be a nonmobile terminal. For example, the mobile terminal may include but is not limited to the foregoing illustrated type of the terminal 11. The nonmobile terminal may be a server, a network attached storage (NAS), a personal computer (PC), a television (TV), a teller machine, a self-service machine, or the like. This is not limited in this embodiment of this application.

The transmission configuration apparatus in this embodiment of this application may be an apparatus having an operating system. The operating system may be an Android operating system, an iOS operating system, or other possible operating systems, and is not limited in this embodiment of this application.

The transmission configuration apparatus provided in this embodiment of this application can implement each process implemented by the method embodiment in FIG. 6, with the same technical effect achieved. To avoid repetition, details are not described herein again.

Figure 9:
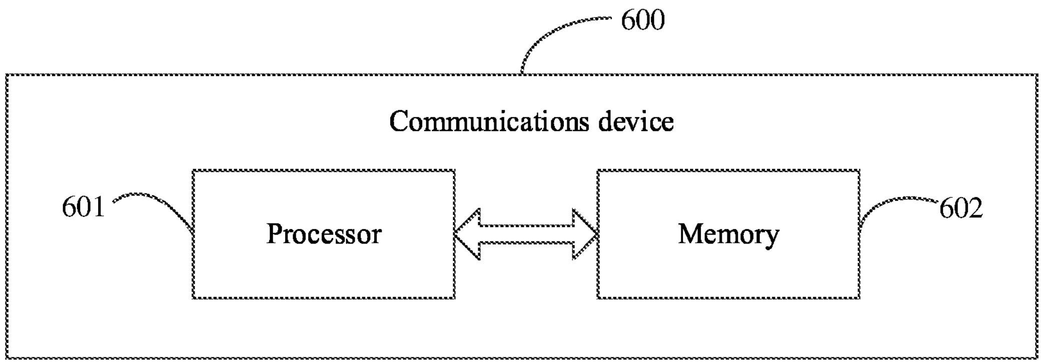
FIG. 9 is a schematic diagram of a structure of a communications device according to an embodiment of this application.

Optionally, as shown in FIG. 9, an embodiment of this application further provides a communications device 600, including a processor 601, a memory 602, and a program or instructions stored in the memory 602 and executable on the processor 601. For example, when the communications device 600 is a terminal device, and the program or instructions are executed by the processor 601, each process of the foregoing transmission configuration method embodiment corresponding to FIG. 6 is implemented, with the same technical effect achieved. When the communications device 600 is a network-side device, and the program or instructions are executed by the processor 601, each process of the foregoing transmission configuration method embodiment corresponding to FIG. 3 is implemented, with the same technical effect achieved. To avoid repetition, details are not described herein again.

Figure 10:
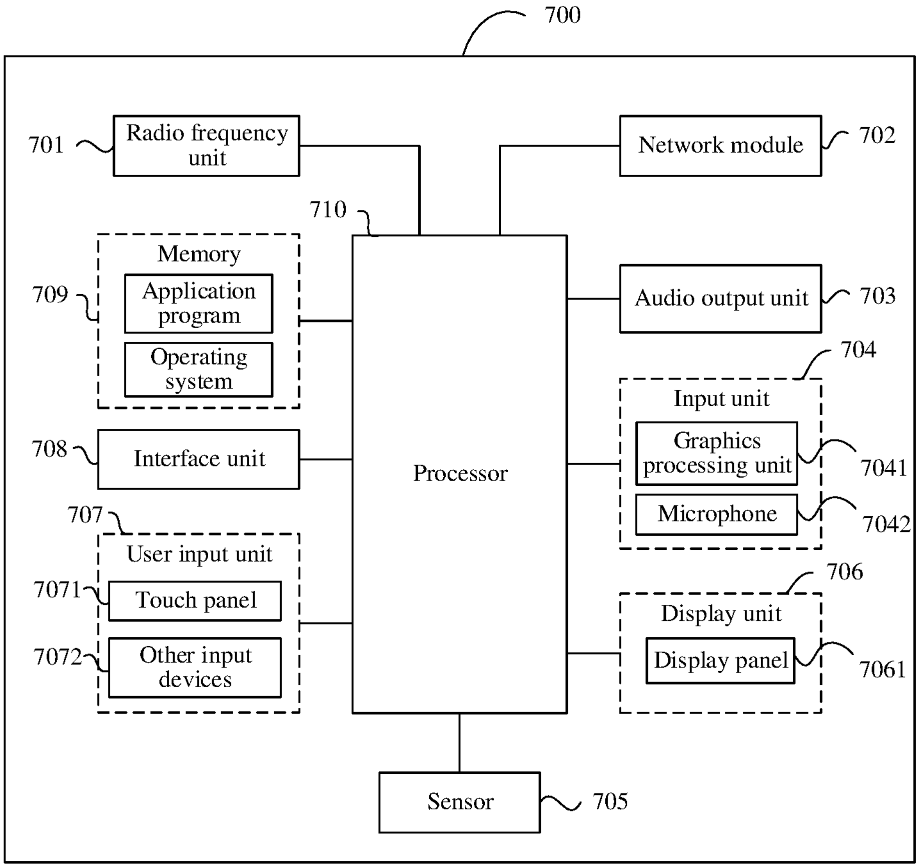
FIG. 10 is a schematic diagram of a structure of a terminal device according to an embodiment of this application.

FIG. 10 is a schematic diagram of a hardware structure of a terminal for implementing an embodiment of this application.

The terminal 700 includes but is not limited to components such as a radio frequency unit 701, a network module 702, an audio output unit 703, an input unit 704, a sensor 705, a display unit 706, a user input unit 707, an interface unit 708, a memory 709, and a processor 710.

A person skilled in the art may understand that the terminal 700 may further include a power supply (for example, a battery) supplying power to all components. The power supply may be logically connected to the processor 710 through a power management system. In this way, functions such as charge management, discharge management, and power consumption management are implemented by using the power management system. The terminal structure shown in FIG. 10 does not constitute a limitation on the terminal. The terminal may include more or fewer components than those shown in the figure, or some components are combined, or component arrangements are different. Details are not described herein again.

It should be understood that, in this embodiment of this application, the input unit 704 may include a graphics processing unit (GPU) 7041 and a microphone 7042. The graphics processing unit 7041 processes image data of a still picture or video obtained by an image capture apparatus (such as a camera) in a video capture mode or an image capture mode. The display unit 706 may include a display panel 7061, and the display panel 7061 may be configured in a form of a liquid crystal display, an organic light-emitting diode, or the like. The user input unit 707 includes a touch panel 7071 and other input devices 7072. The touch panel 7071 is also referred to as a touchscreen. The touch panel 7071 may include two parts: a touch detection apparatus and a touch controller. The other input devices 7072 may include but are not limited to a physical keyboard, a function key (such as a volume control key or a switch key), a trackball, a mouse, and a joystick. Details are not described herein again.

In this embodiment of this application, after receiving downlink data from a network-side device, the radio frequency unit 701 sends the downlink data to the processor 710 for processing, and in addition, sends uplink data to the network-side device. Generally, the radio frequency unit 701 includes but is not limited to an antenna, at least one amplifier, a transceiver, a coupler, a low noise amplifier, a duplexer, and the like.

The memory 709 may be configured to store software programs or instructions and various data. The memory 709 may primarily include a program or instruction storage area and a data storage area. The program or instruction storage area may store an operating system, an application program or instructions (such as an audio play function and an image play function) required by at least one function, and the like. In addition, the memory 709 may include a high-speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory, for example, at least one disk storage device, a flash memory device, or another non-volatile solid-state storage device.

The processor 710 may include one or more processing units. Optionally, the processor 710 may integrate an application processor and a modem processor. The application processor mainly processes the operating system, a user interface, an application program, or an instruction. The modem processor mainly processes wireless communication. For example, the modem processor is a baseband processor. It may be understood that the modem processor may alternatively not be integrated in the processor 710.

The radio frequency unit 701 is configured to receive bearer-related information configured by a first access network device; and the processor 710 is configured to perform cooperative transmission with a second terminal device according to the bearer-related information.

In this embodiment of this application, the first terminal device may perform cooperative transmission with the second terminal device according to the bearer-related information configured for the first terminal device by the first access network device corresponding to the first terminal device, where the second terminal device includes at least one terminal device other than the first terminal device. In this way, at least two terminal devices can implement cooperative transmission between a plurality of terminal devices according to the bearer-related information configured by the network side for each terminal device, thereby implementing continuous transmission between the at least two terminal devices and ensuring service experience of the terminal devices and system efficiency.

Figure 11:
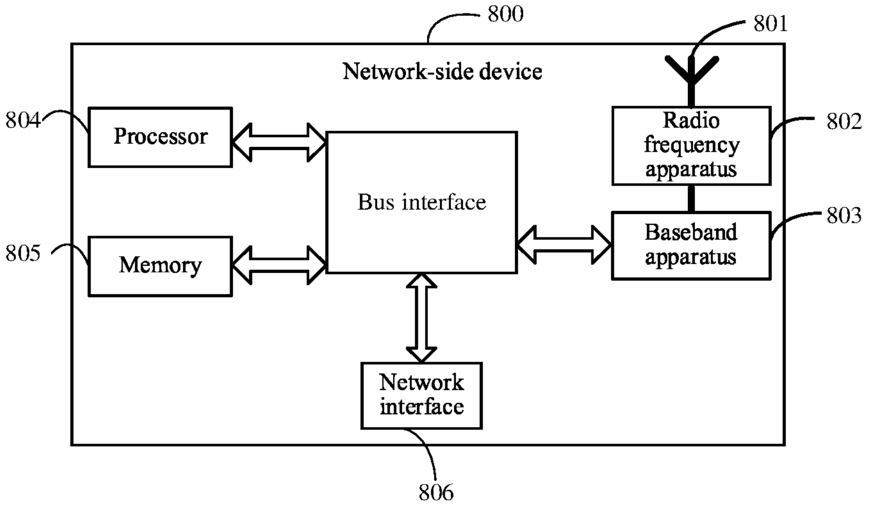
FIG. 11 is a schematic diagram of a structure of a network-side device according to an embodiment of this application.

An embodiment of this application further provides a network-side device. As shown in FIG. 11, the network device 800 includes an antenna 801, a radio frequency apparatus 802, and a baseband apparatus 803. The antenna 801 is connected to the radio frequency apparatus 802. In an uplink direction, the radio frequency apparatus 802 receives information by using the antenna 801, and sends the received information to the baseband apparatus 803 for processing. In a downlink direction, the baseband apparatus 803 processes to-be-sent information, and sends the information to the radio frequency apparatus 802; and the radio frequency apparatus 802 processes the received information and then sends the information out by using the antenna 801.

The method performed by the network-side device in the foregoing embodiment may be implemented in the baseband apparatus 803, and the baseband apparatus 803 includes a processor 804 and a memory 805.

The baseband apparatus 803 may include, for example, at least one baseband processing unit, where a plurality of chips are disposed on the baseband processing unit. As shown in FIG. 11, one of the chips is, for example, the processor 804, connected to the memory 805, to invoke a program in the memory 805 to perform the operation of the network device shown in the foregoing method embodiment.

The baseband apparatus 803 may further include a network interface 806, configured to exchange information with the radio frequency apparatus 802, where the interface is, for example, a common public radio interface (CPRI).

For example, the network-side device in this embodiment of the present application further includes a program or an instruction stored in the memory 805 and executable on the processor 804. When the processor 804 invokes the program or instruction in the memory 805, the method performed by each module shown in FIG. 6 is performed, with the same technical effect achieved. To avoid repetition, details are not described herein again.

An embodiment of this application further provides a non-transitory computer-readable storage medium. The non-transitory computer-readable storage medium stores a program or instructions. When the program or instructions are executed by a processor, each process of the foregoing transmission configuration method embodiment is implemented, with the same technical effect achieved. To avoid repetition, details are not described herein again.

The processor is a processor in the terminal device or network-side device in the foregoing embodiment. The non-transitory computer-readable storage medium includes a computer read-only memory (ROM), a random access memory (RAM), a magnetic disk, or an optical disc.

In addition, an embodiment of this application provides a computer program product. The computer program product is stored in a non-volatile readable storage medium, and the computer program product is executed by a processor to implement each process of the foregoing transmission configuration method embodiment, with the same technical effect achieved. To avoid repetition, details are not described herein again.

In addition, an embodiment of this application provides a chip. The chip includes a processor and a communications interface. The communications interface is coupled to the processor. The processor is configured to execute a program or instructions on a terminal device or a network-side device to implement each process of the foregoing transmission configuration method embodiment, with the same technical effect achieved. To avoid repetition, details are not described herein again.

It should be understood that the chip provided in this embodiment of this application may also be referred to as a system-level chip, a system chip, a chip system, a system-on-chip, or the like.

It should be noted that in this specification, the term "comprise", "include", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element. In addition, it should be noted that the scope of the method and apparatus in the implementations of this application is not limited to performing the functions in an order shown or discussed, and may further include performing the functions in a substantially simultaneous manner or in a reverse order depending on the functions used. For example, the method described may be performed in an order different from that described, and various steps may be added, omitted, or combined. In addition, features described with reference to some examples may be combined in other examples.

According to the foregoing description of the implementations, a person skilled in the art may clearly understand that the methods in the foregoing embodiments may be implemented by using software in combination with a necessary general hardware platform, and certainly may alternatively be implemented by using hardware. Based on such an understanding, the technical solutions of this application essentially or the part contributing to the prior art may be implemented in a form of a software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this application.

The embodiments of this application are described above with reference to the accompanying drawings. However, this application is not limited to the foregoing embodiments. The foregoing embodiments are merely illustrative rather than restrictive. Inspired by this application, a person of ordinary skill in the art can still derive a plurality of variations without departing from the essence of this application and the protection scope of the claims. All these variations shall fall within the protection scope of this application.

What is claimed is:

1. A transmission configuration method, wherein the method comprises:

sending, by a first access network device, bearer-related information to a first terminal device, wherein the bearer-related information is used to instruct the first terminal device to perform cooperative transmission with a second terminal device;

wherein the bearer-related information is used to configure a bearer for the first terminal device, so that the first terminal device and the second terminal device perform bearer aggregation;

wherein the first terminal device satisfies at least one of:

reporting a user's terminal service usage preference; or synchronously receiving service data of a same terminal application with the second terminal device.

2. The method according to claim 1, wherein the bearer-related information comprises one of:

a packet data convergence protocol (PDCP) bearer;

a radio link control (RLC) bearer; or a PDCP bearer and an RLC bearer;

and/or the bearer-related information comprises:

RLC bearers corresponding to PC5 interfaces of the first terminal device and the second terminal device.

3. The method according to claim 2, wherein the bearer-related information further comprises at least one of:

a correspondence between an RLC bearer corresponding to a PC5 interface of the first terminal device and an RLC bearer corresponding to a Uu interface of the first terminal device; or a correspondence between an RLC bearer corresponding to a PC5 interface of the first terminal device and a PDCP bearer corresponding to a Uu interface of the first terminal device.

4. The method according to claim 1, wherein the first terminal device further satisfies at least one of:

a preset subscription condition;

having a same setting or status requirement for a same terminal application as the second terminal device; or a preset condition for communication with the second terminal device.

5. The method according to claim 1, wherein before the sending, by a first access network device, bearer-related information to a first terminal device, the method further comprises:

receiving, by the first access network device, a first request; wherein the first request carries at least one of:

an identifier of the second terminal device;

a correspondence between service data and a bearer type; or link quality between the first terminal device and the second terminal device.

6. The method according to claim 5, wherein the receiving, by the first access network device, a first request comprises one of:

receiving, by the first access network device, the first request sent by a core network device; or receiving, by the first access network device, the first request sent by the first terminal device, wherein the first request is carried in dedicated radio resource control (RRC) signaling.

7. The method according to claim 6, wherein the receiving, by the first access network device, the first request sent by the first terminal device comprises:

receiving, by the first access network device, the first request sent by the first terminal device in a case that at least one of following is satisfied:

support of the first access network device for configuring the bearer-related information for the first terminal device; or a first condition configured by the first access network device, wherein the first condition comprises at least one of: link quality between the first terminal device and the second terminal device being higher than a first quality threshold, or cooperative transmission of specific service data being performed between the first terminal device and the second terminal device.

8. The method according to claim 1, wherein the method further comprises at least one of:

sending, by the first access network device, first configuration signaling to the first terminal device, wherein the first configuration signaling is used to instruct to configure or reconfigure a bearer of the first terminal device;

in a case that the second terminal device enters a radio resource control connected (RRC connected) state and is within coverage of a same access network device as the first terminal device, sending, by the first access network device, second configuration signaling to the second terminal device, wherein the second configuration signaling is used to instruct to configure or reconfigure a bearer of the second terminal device;

in a case that the second terminal device is not in an RRC connected state, paging, by the first access network device, the second terminal device, and after the second terminal device enters the RRC connected state, sending third configuration signaling to the second terminal device, wherein the third configuration signaling is used to instruct to configure or reconfigure a bearer of the second terminal device;

in a case that the first terminal device and the second terminal device are within coverage of different access network devices, after the second terminal device is handed over to coverage of the first access network device, sending, by the first access network device, fourth configuration signaling to the second terminal device, wherein the fourth configuration signaling is used to instruct to configure or reconfigure a bearer of the second terminal device; or in a case that the first terminal device and the second terminal device are within coverage of different access network devices, sending, by the first access network device, fifth configuration signaling to a second access network device corresponding to the second terminal device, wherein the fifth configuration signaling is used to instruct the second access network device to configure or reconfigure a bearer of the second terminal device.

9. The method according to claim 1, wherein the method further comprises:

reconfiguring, by the first access network device, the bearer-related information.

10. The method according to claim 9, wherein the reconfiguring, by the first access network device, the bearer-related information comprises at least one of:

in a case that an answer mode of a user corresponding to the first terminal device is changed, reconfiguring, by the first access network device, the bearer-related information; or in a case that link quality between the first terminal device and the second terminal device is higher than a second quality threshold, reconfiguring, by the first access network device, the bearer-related information.

11. The method according to claim 9, wherein reconfigured bearer-related information is used to indicate at least one of:

that in a case that a packet data convergence protocol (PDCP) bearer is changed, the first terminal device is to perform a first operation on the PDCP bearer, wherein the first operation comprises at least one of reestablishment or security update;

that in a case that a PDCP bearer is not changed, the first terminal device is to perform PDCP data recovery; or that the first terminal device is to reset all state variables.

12. The method according to claim 1, wherein the method further comprises:

in a case that the second terminal device is handed over from the first access network device to a third access network device, de-configuring, by the first access network device, the bearer-related information.

13. The method according to claim 1, wherein in a case that the first terminal device satisfies a condition for handover from the first access network device to a fourth access network device, the method further comprises one of:

if there are a plurality of remaining terminal devices after the first terminal device is excluded from a plurality of terminal devices, reconfiguring, by the first access network device, corresponding bearers for the remaining terminal devices to perform cooperative transmission;

if there is one remaining terminal device after the first terminal device is excluded from a plurality of terminal devices, reconfiguring, by the first access network device, a bearer of the remaining terminal device as a third bearer type, wherein the third bearer type is presence of a packet data convergence protocol (PDCP) bearer and a radio link control (RLC) bearer in a same terminal device; or sending, by the first access network device to the fourth access network device, a first handover request message corresponding to the first terminal device, wherein the first handover request message comprises at least one of the bearer-related information or core network user plane connection information corresponding to the first terminal device.

14. The method according to claim 1, wherein in a case that a core network user plane connection corresponding to the first terminal device is switched from a first core network user plane connection to a second core network user plane connection, the method further comprises:

placing, by the first access network device, data to be transmitted based on a user plane path corresponding to the second core network user plane connection, after a last endmarker of data to be transmitted based on a user plane path corresponding to the first core network user plane connection.

15. The method according to claim 1, wherein in a case that the first terminal device and the second terminal device correspond to different core network user plane connections, the bearer-related information is further used to indicate:

that the first terminal device is to send, to the second terminal device, a first receiving/sending state that is corresponding to a received part and/or a sent part and for cooperative transmission, wherein the first receiving/sending state is used for the second terminal device to continue transmission of an unreceived part and/or an unsent part with a core network device; and that the first terminal device is to maintain or reset a receiving/sending state.

16. The method according to claim 1, wherein in a case that the first terminal device and the second terminal device correspond to different core network user plane connections, before the sending, by a first access network device, bearer-related information to a first terminal device, the method further comprises:

receiving, by the first access network device, a second request sent by the first terminal device or the second terminal device, wherein the bearer-related information is a response to the second request, and the bearer-related information is further used to instruct the first terminal device to send a transmission configuration and a receiving/sending state that are for cooperative transmission to the second terminal device;

and/or the method further comprises:

receiving, by the first access network device, a third request sent by the first terminal device or the second terminal device; and sending, by the first access network device, second information to the second terminal device in response to the third request, wherein the second information is used to indicate one of:

that the second terminal device is to initialize an L2 status;

that the second terminal device is to obtain an L2 status from the first terminal device;

a core network configuration established for the second terminal device, and that data of a core network user plane connection corresponding to the second terminal device is located after data of a core network user plane connection corresponding to the first terminal device; or an access network configuration established for the second terminal device and all receiving/sending states for cooperative transmission by the first terminal device.

17. A transmission configuration method, wherein the method comprises:

receiving, by a first terminal device, bearer-related information configured by a first access network device; and performing, by the first terminal device, cooperative transmission with a second terminal device according to the bearer-related information;

wherein the bearer-related information is used to configure a bearer for the first terminal device, so that the first terminal device and the second terminal device perform bearer aggregation;

wherein the first terminal device satisfies at least one of:

reporting a user's terminal service usage preference;

or synchronously receiving service data of a same terminal application with the second terminal device.

18. The method according to claim 17, wherein the bearer-related information comprises:

radio link control (RLC) bearers corresponding to PC5 interfaces of the first terminal device and the second terminal device; wherein in a case that a packet data convergence protocol (PDCP) bearer is located in the first terminal device, the performing, by the first terminal device, cooperative transmission with a second terminal device according to the bearer-related information comprises at least one of:

performing, by the first terminal device, split transmission from the PDCP bearer to a plurality of RLC bearers;

performing, by the first terminal device, duplication transmission from the PDCP bearer to a plurality of RLC bearers;

transmitting, by the first terminal device, data to the second terminal device through an RLC bearer corresponding to a PC5 interface of the first terminal device;

mapping, by the first terminal device, an RLC bearer corresponding to the first terminal device to the PDCP bearer, and performing reception processing; or mapping, by the first terminal device, an RLC bearer corresponding to a PC5 interface of the second terminal device to the PDCP bearer, and performing reception processing;

or in a case that a PDCP bearer is located in the second terminal device, the performing, by the first terminal device, cooperative transmission with a second terminal device according to the bearer-related information comprises at least one of:

mapping, by the first terminal device, an RLC bearer corresponding to a PC5 interface of the second terminal device to an RLC bearer corresponding to the first terminal device, and performing reception processing;

or sending, by the first terminal device, data received by an RLC bearer corresponding to the first terminal device to the second terminal device through an RLC bearer corresponding to a PC5 interface of the first terminal device.

19. A terminal device, comprising a memory, a processor, and a program or instructions stored in the memory and executable on the processor, wherein when the program or instructions are executed by the processor, steps of the transmission configuration method according to claim 17 are implemented.

20. A network-side device, comprising a memory, a processor, and a program or instructions stored in the memory and executable on the processor, wherein the program or instructions, when executed by the processor, cause the network-side device to perform:

sending bearer-related information to a first terminal device, wherein the bearer-related information is used to instruct the first terminal device to perform cooperative transmission with a second terminal device;

wherein the bearer-related information is used to configure a bearer for the first terminal device, so that the first terminal device and the second terminal device perform bearer aggregation;

wherein the first terminal device satisfies at least one of:

reporting a user's terminal service usage preference;

or synchronously receiving service data of a same terminal application with the second terminal device.

* * * * *